(12) United States Patent
Kakizaki (10) Patent No.: US 10,144,272 B2
(45) Date of Patent: Dec. 4, 2018

(54) AIR-CONDITIONING APPARATUS

(71) Applicant: HONDA MOTOR CO., LTD., Tokyo (JP)

(72) Inventor: Shinji Kakizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 105 days.

(21) Appl. No.: 15/191,969

(22) Filed: Jun. 24, 2016

(65) Prior Publication Data

US 2016/0375744 A1 Dec. 29, 2016

(30) Foreign Application Priority Data

Jun. 26, 2015 (JP) ................................. 2015-128660

(51) Int. Cl.
| | | |
|---|---|---|
| *B60H 1/32* | (2006.01) | |
| *B60H 1/00* | (2006.01) | |
| *F25B 39/04* | (2006.01) | |
| *F25B 40/02* | (2006.01) | |
| *F28D 1/053* | (2006.01) | |

(52) U.S. Cl.
CPC ........ *B60H 1/3205* (2013.01); *B60H 1/00071* (2013.01); *B60H 1/00328* (2013.01); *B60H 1/00392* (2013.01); *B60H 1/3204* (2013.01); *F25B 39/04* (2013.01); *F25B 40/02* (2013.01);
(Continued)

(58) Field of Classification Search
CPC ............... B60H 1/3205; B60H 1/3204; B60H 1/00392; B60H 1/00071; B60H 1/00328; B60H 2001/00178; B60H 2001/00085; F25B 40/02; F25B 39/04; F28D 1/05391
See application file for complete search history.

(56) References Cited

U.S. PATENT DOCUMENTS

| | | | | |
|---|---|---|---|---|
| 4,483,156 A | * | 11/1984 | Oudenhoven | ........... F25B 39/00 62/324.1 |
| 5,146,767 A | * | 9/1992 | Kadle | .................. B60H 1/3227 62/474 |

(Continued)

FOREIGN PATENT DOCUMENTS

| | | | |
|---|---|---|---|
| DE | 4034290 A1 | * | 5/1992 |
| JP | 2013-180648 A | | 9/2013 |

OTHER PUBLICATIONS

Korcian, Vehicle Air Conditioning Unit . . . , May 7, 1992, DE4034290A1, Whole Document.*

*Primary Examiner* — Larry Furdge
(74) *Attorney, Agent, or Firm* — Westerman, Hattori, Daniels & Adrian, LLP (57) ABSTRACT

An air-conditioning apparatus includes a heat exchange unit including a condenser that radiates heat of refrigerant discharged from a compressor, and an evaporator that expands the refrigerant flowing out of the condenser using an expanding device and then absorbs ambient heat into the evaporator, the condenser and the evaporator being connected to each other. According to operation mode, air to be supplied to a vehicle interior selectively exchanges heat with the condenser or the evaporator, or sequentially exchanges heat with the condenser and the evaporator. A subcooler that cools the refrigerant flowing out of the condenser before the refrigerant is expanded by the expanding device is provided. The subcooler is disposed at a position below the evaporator and to which condensed water flows down.

12 Claims, 7 Drawing Sheets

(52) U.S. Cl.
CPC .............. *B60H 2001/00085* (2013.01); *B60H 2001/00178* (2013.01); *F28D 1/05391* (2013.01)

(56) References Cited

U.S. PATENT DOCUMENTS

| | | | | |
|---|---|---|---|---|
| 5,392,612 | A * | 2/1995 | Alsenz | F25B 41/062 62/115 |
| 6,237,359 | B1 * | 5/2001 | Hebert | A61B 17/322 62/348 |
| 2010/0083676 | A1 * | 4/2010 | Merritt | E03B 3/28 62/93 |
| 2013/0220584 | A1 * | 8/2013 | Mishiro | F25B 39/00 165/143 |

* cited by examiner

AIR-CONDITIONING APPARATUS

CROSS REFERENCES TO RELATED APPLICATIONS

The present application claims priority under 35 U.S.C. § 119 to Japanese Patent Application No. 2015-128660, filed Jun. 26, 2015, entitled "Air-conditioning Apparatus." The contents of this application are incorporated herein by reference in their entirety.

TECHNICAL FIELD

The present disclosure relates to an air-conditioning apparatus used in a vehicle.

BACKGROUND

In vehicles having no internal combustion engine, such as electric vehicles and fuel cell vehicles, the heat of the engine cannot be used as a heat source during heating operation. For this reason, in this type of vehicle, an air-conditioning apparatus that performs heating operation using a heat pump cycle is used. In many air-conditioning apparatuses using a heat pump cycle, a refrigerant flow passage is switched between cooling operation and heating operation.

However, in an air-conditioning apparatus that switches a refrigerant flow passage between cooling operation and heating operation, the number of various incidental components such as pipes, valves, and fittings increases, and therefore the increase in product cost and the increase in weight are likely to be caused, and, in addition, there is fear that the air-conditioning performance is worsened, for example, by the increase in flow resistance of refrigerant.

For this reason, as an air-conditioning apparatus that can cope with this, an air-conditioning apparatus is devised in which a heat exchange unit in which refrigerant is circulated between a condenser and an evaporator is disposed in a casing, and air passing through the casing and supplied to a vehicle interior exchanges heat selectively with the condenser or with the evaporator according to the operation mode (see, for example, Japanese Unexamined Patent Application Publication No. 2013-180648). In the heat exchange unit of this air-conditioning apparatus, the refrigerant outlet of the condenser is connected to the refrigerant inlet of the evaporator, the refrigerant outlet of the evaporator is connected to the suction part of a compressor, and the discharge part of the compressor is connected through an expansion valve to the inlet of the evaporator.

However, in the case of the air-conditioning apparatus described in Japanese Unexamined Patent Application Publication No. 2013-180648, there is a problem in that refrigerant compressed in the compressor condenser not effectively cooled (heat-radiated) in the condenser, and the refrigerant is hard to subcool before the refrigerant is expanded in the expansion valve. In this case, the evaporator is poorly supplied with subcooled refrigerant, and there is room for improvement in terms of air-conditioning efficiency.

SUMMARY

The present application describes, for example, an air-conditioning apparatus in which an evaporator can be supplied with subcooled refrigerant and that has a high air-conditioning efficiency.

To solve the above problem, in an aspect of the present disclosure, an air-conditioning apparatus (for example, the air-conditioning apparatus 1 in the embodiment) includes a heat exchange unit (for example, the heat exchange unit 11 in the embodiment) including a condenser (for example, the condenser 19 in the embodiment) that radiates heat of refrigerant discharged from a compressor (for example, the compressor 18 in the embodiment), and an evaporator (for example, the evaporator 21 in the embodiment) that expands the refrigerant flowing out of the condenser using an expanding device (for example, the expansion valve 20 in the embodiment) and then absorbs ambient heat into the evaporator, the condenser and the evaporator being connected to each other. According to operation mode, air to be supplied to a vehicle interior selectively exchanges heat with the condenser or the evaporator or sequentially exchanges heat with the condenser and the evaporator. A subcooler (for example, the subcooler 25 in the embodiment) that cools the refrigerant flowing out of the condenser before the refrigerant is expanded by the expanding device is disposed at a position below the evaporator to which condensed water flows down.

Owing to the above configuration, during heating operation, air to be supplied to the vehicle interior is heated by heat exchange with the condenser when passing through the condenser, and hot air is supplied to the vehicle interior. During cooling operation, air to be supplied to the vehicle interior is cooled by heat absorption in the evaporator when passing through the evaporator, and cold air is supplied to the vehicle interior. Since switching can be performed between cooling and heating just by switching the flow of air in the air-conditioning apparatus, the number of components can be reduced compared to a configuration in which switching is performed between various operations by switching the flow of refrigerant as in a conventional heat pump cycle. In the operation in the above-described various modes, when air passing through the evaporator is cooled below the dew point when passing through evaporator, the moisture in the air is condensed to become condensed water and attaches to the evaporator. In the air-conditioning apparatus according to this disclosure, since the subcooler is disposed at a position below the evaporator to which condensed water flows down, the low-temperature condensed water attached to the evaporator reaches the subcooler and subcools the refrigerant in the subcooler. As a result, the cooling energy of the condensed water is efficiently recovered by the refrigerant in the subcooler, and the refrigerant is subcooled before the refrigerant is expanded by the expanding device. Therefore, by employing this configuration, the air-conditioning efficiency is improved.

The condenser and the evaporator of the heat exchange unit may be arranged side by side in a substantially horizontal direction. In this case, a blower blowing air to the evaporator and a blower blowing air to the condenser can be arranged side by side in a substantially horizontal direction. For this reason, the blower blowing air to the evaporator and the blower blowing air to the condenser can be intensively arranged in a casing. Therefore, the structure of the casing can be simplified and the size of the casing can be reduced.

The condenser and the evaporator may be connected to each other with a heat insulator (for example, the heat-insulating member 22 in the embodiment) interposed therebetween in a region except for a part connecting flow passages of the condenser and the evaporator. In this case, the surface of the condenser and the surface of the evaporator can be prevented from directly exchanging heat with each other by the heat-insulator. Since the condenser and the evaporator can be disposed close to each other, the refrigerant passage between the condenser and the evaporator can be shortened, and the pressure loss in the refrigerant passage can thereby be reduced. Therefore, when this configuration is employed, air to be supplied to the vehicle interior efficiently exchanges heat with the condenser and the evaporator, the air-conditioning efficiency is improved, and, since the refrigerant passage is shortened, the weight and cost can be reduced.

The refrigerant flowing through the condenser and the evaporator may flow from an upper passage to a lower passage, and air exchanging heat with the condenser and air exchanging heat with the evaporator may flow upwardly. In this case, the direction of the flow of refrigerant flowing through the condenser and the evaporator and the direction of the flow of air exchanging heat with the refrigerant approach directions opposite to each other. For this reason, the efficiency of heat exchange between refrigerant and air is improved.

The heat exchange unit may have a receiver tank (for example, the receiver tank 24 in the embodiment) that separates the refrigerant flowing out of the condenser into gas and liquid before the refrigerant flows into the subcooler, and the receiver tank may be disposed in an air flow part below the condenser. In this case, air flowing through the air flow part below the condenser cools the refrigerant in the receiver tank. Therefore, the refrigerant is cooled in the receiver tank before the refrigerant flows into the subcooler. For this reason, even in a case in which sufficient condensed water is not generated in the evaporator, the refrigerant can be subcooled by the receiver tank and the subcooler.

The heat exchange unit may have a chamber (for example, the chamber 23 in the embodiment) that dissipates flow noise of the refrigerant flowing out of the evaporator and sucked into the compressor, and the subcooler and the chamber may be integrated with the receiver tank below the evaporator and the condenser. In this case, since the subcooler and the chamber are integrated with the receiver tank below the evaporator and the condenser, the size of the whole heat exchange unit can be reduced. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to this disclosure, for example, since the subcooler is disposed at a position below the evaporator to which condensed water flows down, and the cooling energy of condensed water attached to the evaporator can foe efficiently recovered by the refrigerant in the subcooler, the evaporator can be supplied with subcooled refrigerant. Therefore, according to this disclosure, the air-conditioning efficiency can be improved while suppressing the increase of the number of incidental components.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described below with reference to the drawings. Directions such as front, back, top, bottom, left, and right in the following description are the same as directions in a vehicle unless otherwise noted. In the drawings referred to below, the arrow FR designates the front of the vehicle, the arrow UP designates the upper side of the vehicle, and the arrow LH designates the left side of the vehicle.

Figure 1:
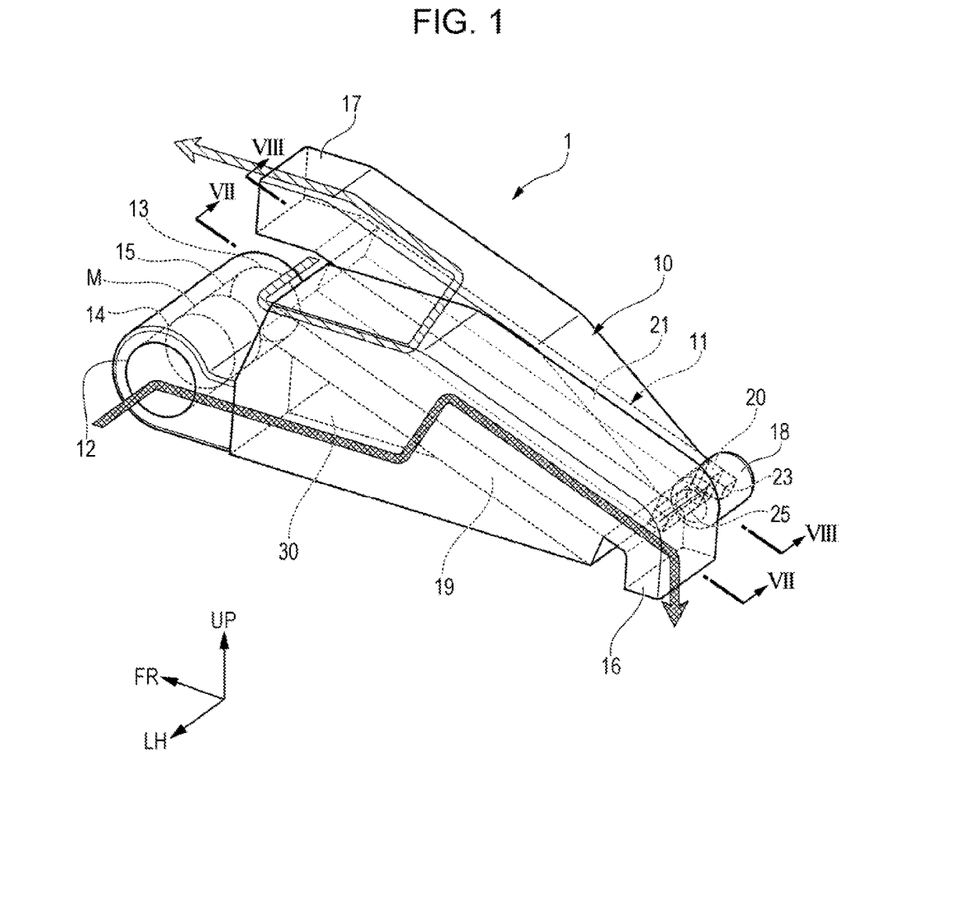
FIG. 1 is a perspective view of an air-conditioning apparatus according to an embodiment of this disclosure.

FIG. 1 is a perspective view showing the schematic configuration of an air-conditioning apparatus 1 according to this embodiment. The air-conditioning apparatus 1 according to this embodiment is mounted on a vehicle such as an electric vehicle having no engine (internal combustion engine) as a vehicle driving source. The air-conditioning apparatus 1 has a casing 10 and a heat exchange unit 11 in which refrigerant can circulate. The heat exchange unit 11 forms a heat pump cycle that transfers heat by the circulation of the refrigerant therein.

The casing 10 is formed in a substantially rectangular parallelepiped shape, the lower front thereof is disposed so as to face a motor room in front of the interior of the vehicle, and the upper front thereof and the lower back thereof are disposed close to the vehicle interior. A pair of inlet ducts (a first inlet duct 12 and a second inlet duct 13) are formed at the front end of the casing 10.

The first inlet duct 12 is located at the front end of the casing 10 and has a first air intake (not shown) that is open toward one side in the vehicle width direction. A first blower 14 is housed in the first inlet duct 12. The first blower 14 takes in inside air or outside air (hereinafter sometimes collectively referred to as air) through the first air intake into the casing 10.

The second inlet duct 13 is located at the front end of the casing 10 and has a second air intake (not shown) that is open toward the other side in the vehicle width direction. A second blower 15 is housed in the second inlet duct 13. The second blower 15 takes in air through the second air intake into the casing 10.

The first blower 14 and the second blower 15 are disposed at the front end of the casing 16, spaced apart from each other in the vehicle width direction, and coaxially with each other. In this embodiment, the first blower 14 and the second blower 15 are driven by a common motor M disposed therebetween. The first blower 14 and the second blower 15 may be driven by separate motors.

The casing 10 has a first outlet duct 16 formed therein that guides air introduced through the first inlet duct 12 and flowing through a predetermined passage in the casing 10 (a passage in the left half of the casing 10), to the outside through the left lower back of the casing 10. The casing 10 has a second outlet duct 17 formed therein that guides air introduced through the second inlet duct 13 and flowing through a predetermined passage in the casing 10 (a passage in the right half of the casing 10), to the outside through the right upper front of the casing 10.

A first blow switching door (not shown) that selectively opens the air outlet either to the vehicle interior or to the outside of the vehicle interior is provided on the downstream side of the first outlet duct 16. Similarly, a second blow switching door (not shown) that selectively opens the air outlet either to the vehicle interior or to the outside of the vehicle interior is provided on the downstream side of the second outlet duct 17. The first blow switching door connects the first outlet duct 16 to the outside of the vehicle interior during cooling operation, and connects the first outlet duct 16 to the vehicle interior, for example, a foot air outlet during heating operation. The second blow switching door connects the second outlet duct 17 to the vehicle interior, for example, a VENT air outlet during cooling operation, and connects the second outlet duct 17 to the outside of the vehicle interior during heating operation.

Figure 2:
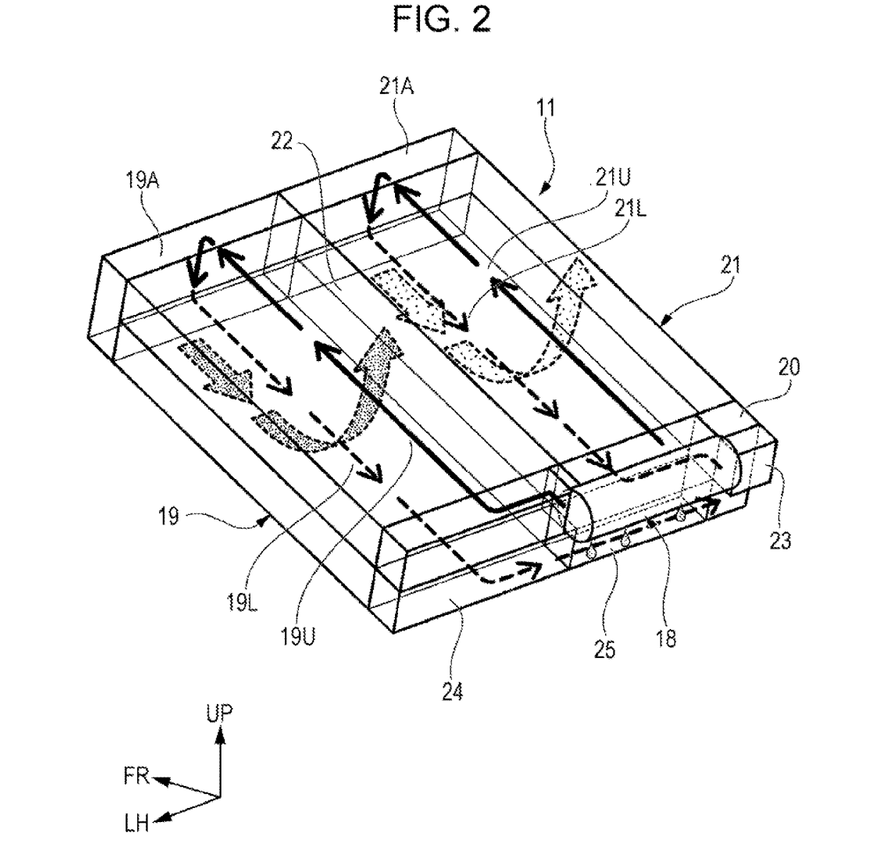
FIG. 2 is a perspective view of a heat exchange unit according to an embodiment of this disclosure.
Figure 3:
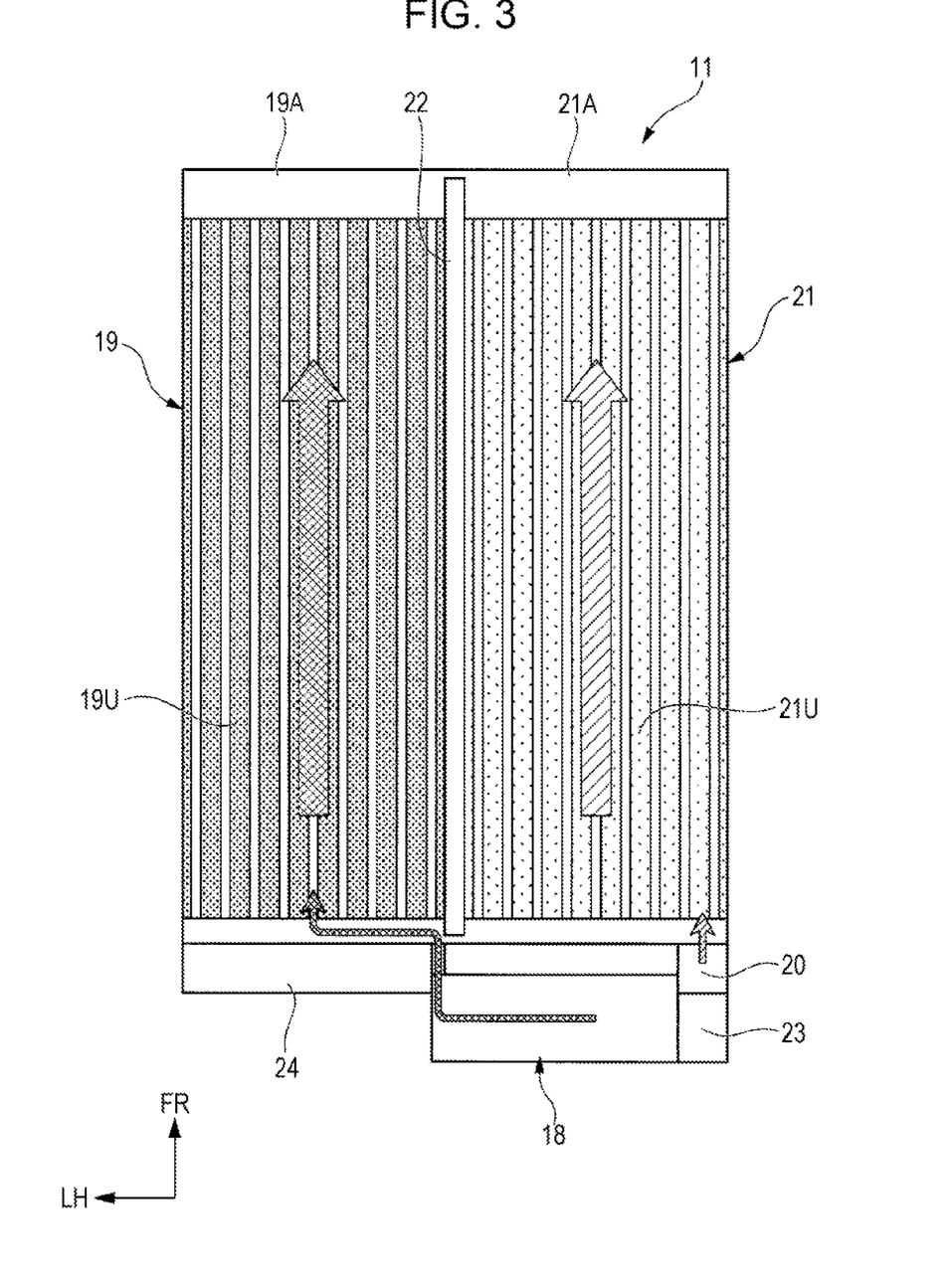
FIG. 3 is a top view of a heat exchange unit according to an embodiment of this disclosure.
Figure 4:
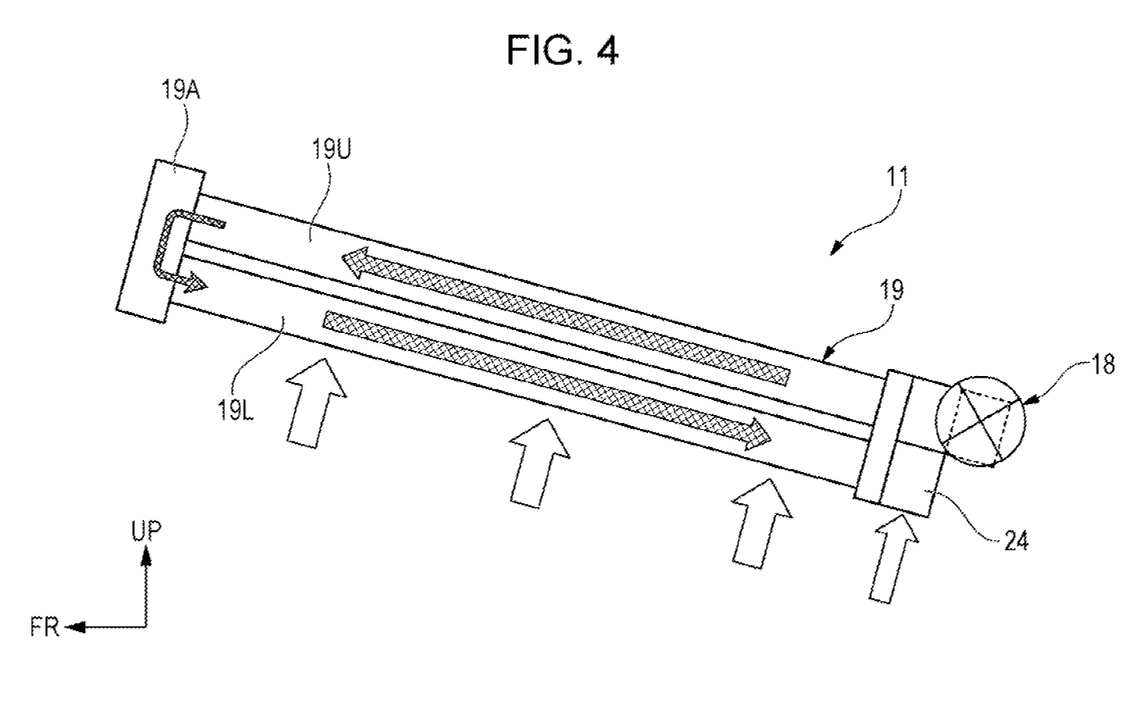
FIG. 4 is a left side view of a heat exchange unit according to an embodiment of this disclosure.

FIG. 2 is a perspective view showing the schematic configuration of the heat exchange unit 11. FIG. 3 shows a top view of the heat exchange unit 11, and FIG. 4, FIG. 5, and FIG. 6 respectively show left side, bottom, and right side views of the heat exchange unit 11. The heat exchange unit 11 has a compressor 18 that compresses and discharges the refrigerant in the flow passage, a condenser 19 through which the refrigerant discharged from the compressor 18 flows and that radiates the heat of the refrigerant, an expansion valve 20 that is an expanding device that expands the refrigerant flowing out of the condenser 19, and an evaporator 21 through which the refrigerant expanded by the expansion valve 20 flows and that absorbs the ambient heat by using the refrigerant. The condenser 19 has an upper passage 19U and a lower passage that make a U-turn and are connected to each other at a U-turn connecting part 19A at the front end. The evaporator 21 has an upper passage 21U and a lower passage 21L that make a U-turn and are connected to each other at a U-turn connecting part 21A at the front end. In the case of this embodiment, the refrigerant in the condenser 19 flows from the upper end of the back part through the upper passage 19U toward the front end, makes a U-turn at the U-turn connecting part 19A, and flows through the lower passage 19L toward the back end. The refrigerant in the evaporator 21 flows from the upper end of the back part through the upper passage 21U toward the front end, makes a U-turn at the U-turn connecting part 21A, and flows through the lower passage 21L toward the back end.

Figure 5:
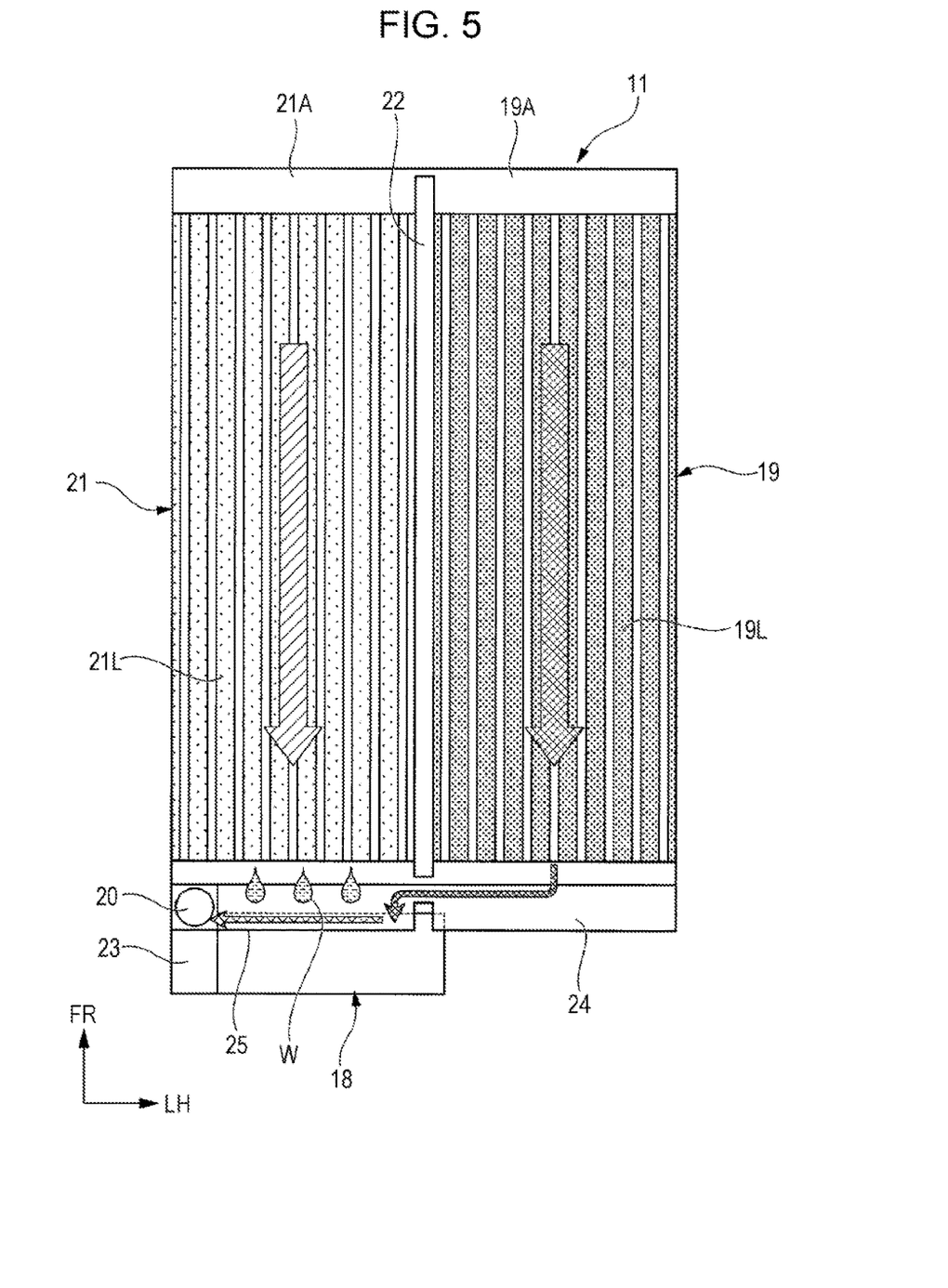
FIG. 5 is a bottom view of a heat exchange unit according to an embodiment of this disclosure.
Figure 6:
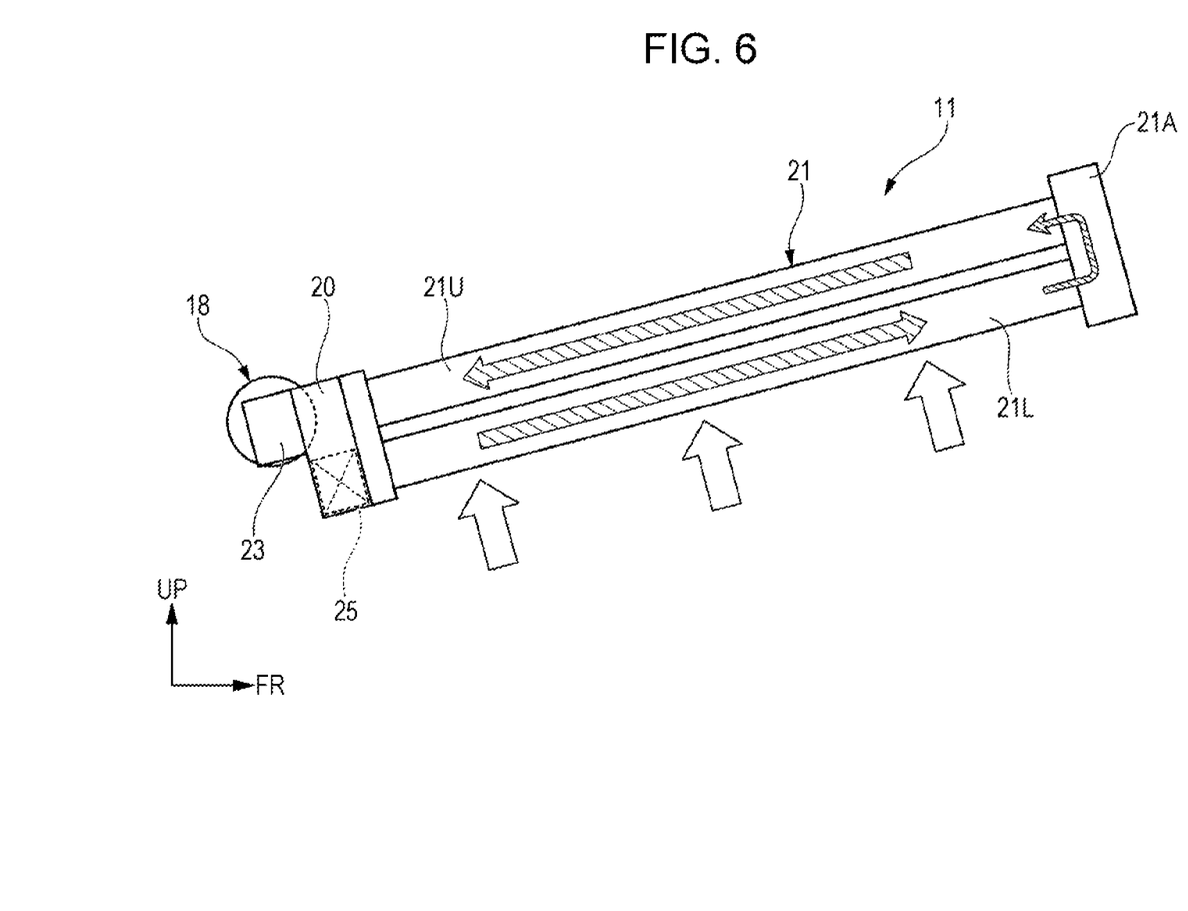
FIG. 6 is a right side view of a heat exchange unit according to an embodiment of this disclosure.

The condenser 19 and the evaporator 21 are joined to each other by brazing or the like, with the right side of the condenser 19 and the left side of the evaporator 21 butting each other. As shown in FIG. 3 and FIG. 5, a heat-insulating member 22 (heat insulator) also serving as an air barrier is interposed between the right side surface of the condenser 19 and the left side surface of the evaporator 21.

The heat exchange unit 11 including the condenser 19 and the evaporator 21 is placed in the casing 10 so as to be inclined in the front-back direction at a predetermined angle such that the front is higher than the back. The condenser 19 and the evaporator 21 of the heat exchange unit 11 are disposed, in this state, side by side in the vehicle width direction (substantially horizontal direction). The inside of the casing 10 is partitioned by a partition wall 30 into left and right internal passages as shown in FIG. 1.

The compressor 18 is formed in a substantially cylindrical shape, and is attached to the back end face of the heat exchange unit 11 such that the axial direction of the compressor 18 is substantially parallel to the left-right direction of the heat exchange unit 11. More specifically, the compressor 18 is attached across the upper-half of the back end of the evaporator 21 and the upper half of the back end of the condenser 19.

A chamber 23 for dissipating the flow noise of the refrigerant returning through the lower passage 21L of the evaporator 21 is provided on the upper half of the back end of the evaporator 21. The refrigerant passing through the lower passage 21L of the evaporator 21 flows into the suction part of the compressor 18 through the chamber 23. The discharge part of the compressor 18 is connected to the upper passage 19U of the condenser 19 at the back end of the condenser 19.

A receiver tank 24 that separates the refrigerant returning from the lower passage 19L of the condenser 19 into gas and liquid is attached to the lower half of the back end of the condenser 19. The refrigerant passing through the receiver tank 24 flows into a subcooler 25 attached to the lower half of the back end of the evaporator 21. The refrigerant flowing into the subcooler 25 is subcooled in the subcooler 25 and then flows through the expansion valve 20 into the upper passage 21U of the evaporator 21. The subcooler 25 and the chamber 23 are integrated with the receiver tank 24 at the lower ends of the back parts of the evaporator 21 and the condenser 19.

The subcooler 25 is a part that subcools the refrigerant flowing out of the condenser 19 before the refrigerant is expanded in the expansion valve 20, and, basically, subcools the refrigerant in the subcooler 25 by exchanging heat with air passing through the space around the subcooler 25.

Here, the heat exchange unit 11 according to this embodiment is, as described above, inclined in the front-back direction at a predetermined angle such that the front is higher than the back, and the subcooler 25 is disposed at the lower half of the back end of the evaporator 21. For this reason, the outer surface of the subcooler 25 of the heat exchange unit 11 is located at a position to which condensed water W attached to the evaporator 21 flows down (on a route through which condensed water W flows down). Therefore, the outer surface of the subcooler 25 is cooled by low-temperature condensed water W flowing down from the evaporator 21. In the case of this embodiment, part of the compressor 18 and the chamber 23 are also located at a position to which condensed water W attached to the evaporator 21 flows down.

The expansion valve 20 connected to the subcooler 25 expands the refrigerant subcooled by the subcooler 25, and discharges low-temperature and low-pressure two-phase gas-liquid (liquid phase rich) atomized refrigerant to the upper passage 21U of the evaporator 21. Instead of the expansion valve 20, an orifice, a diffuser, or the like can also be used.

The condenser 19 is configured to be able to radiate heat by using high-temperature and high-pressure refrigerant discharged from the compressor 18, exchanges heat with air directed from the first inlet duct 12 to the first outlet duct 16 in the casing 10, and heats the air passing through the space around the condenser 19. As shown by arrows in FIG. 2, in the casing 10, air passes through the condenser 13 from the lower front part to the upper back part.

The evaporator 21 exchanges heat between low-temperature and low-pressure refrigerant flowing through the evaporator 21 and air directed from the second inlet duct 13 to the second outlet duct 17 in the casing 10, and cools the air passing through the space around the evaporator 21, for example, by the heat absorption when the refrigerant evaporates. As shown by arrows in FIG. 2, in the casing 10, air passes through the evaporator 21 from the lower front part to the upper back part.

Next, the operation of the air-conditioning apparatus 1 according to this embodiment will be described. The air-conditioning apparatus 1 according to this embodiment can switch between cooling operation and heating operation by switching the flow of air in the casing 10.

In cooling operation, the first outlet duct 16 is connected to the outside of the vehicle interior by the first blow switching door, and the second outlet duct 17 is connected, for example, to a VENT air outlet in the vehicle interior by the second blow switching door.

Figure 7:
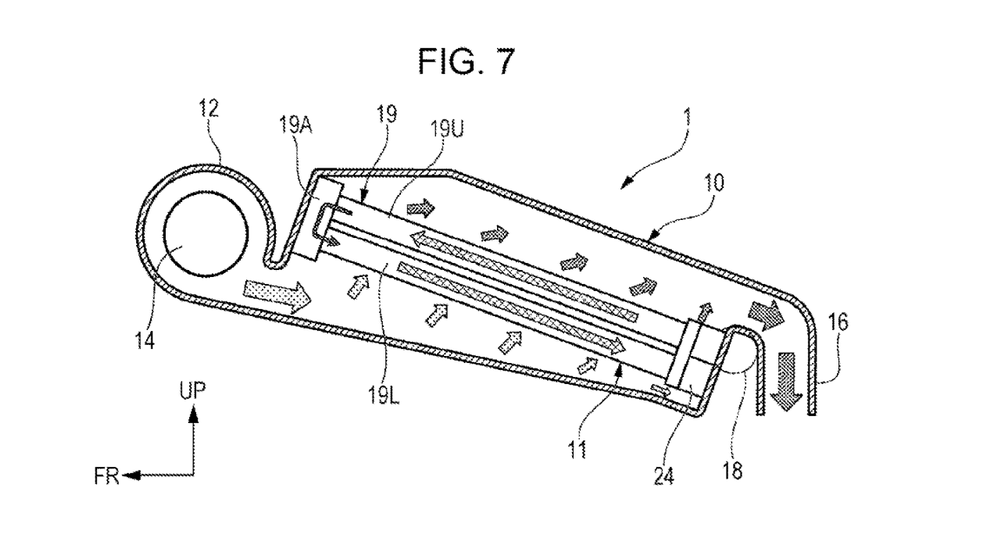
FIG. 7 is a sectional view of a heat exchange unit according to an embodiment of this disclosure taken along line VII-VII of FIG. 1.
Figure 8:
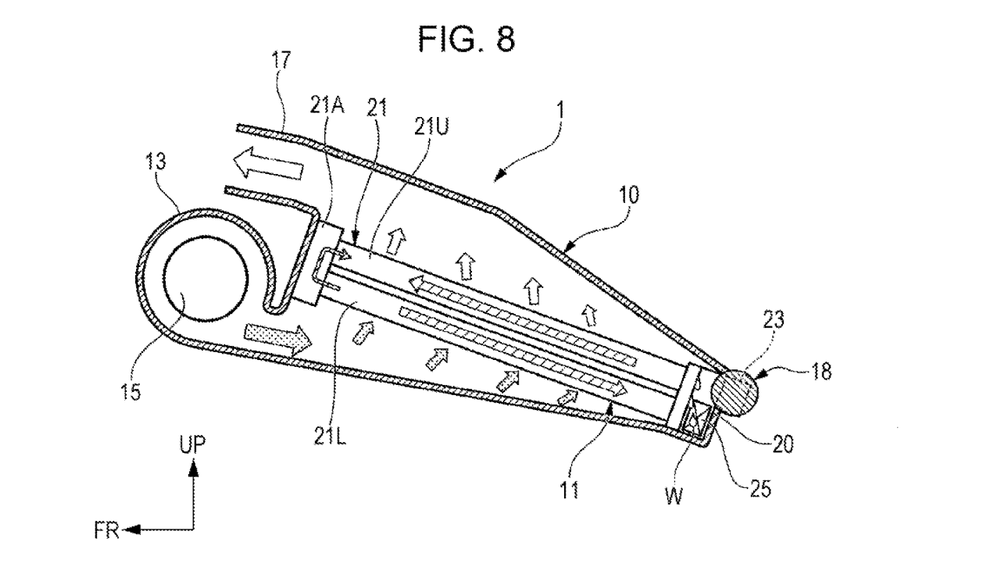
FIG. 8 is a sectional view of a heat exchange unit according to an embodiment of this disclosure taken along line VIII-VIII of FIG. 1.

When the first blower 14 and the second blower 15 are driven in this state, air is taken into the first inlet duct 12 and the second inlet duct 13. As shown in FIG. 7, in the casing 10, the air taken into the first inlet duct 12 exchanges heat with the condenser 19 when passing through the condenser 13, then passes through the first outlet duct 16, and is discharged to the outside of the vehicle interior. On the other hand, as shown in FIG. 8, in the casing 10, the air taken into the second inlet duct 13 exchanges heat with the evaporator 21 when passing through the evaporator 21, then passes through the second outlet duct 17, and is blown as cold air into the vehicle interior.

In heating operation, the first outlet duct 16 is connected, for example, to a foot air outlet in the vehicle interior by the first blow switching door, and the second outlet duct 17 is connected to the outside of the vehicle interior by the second blow switching door.

When the first blower 14 and the second blower 15 are driven in this state, as shown in FIG. 7, in the casing 10, the air taken into the first inlet duct 12 exchanges heat with the condenser 19 when passing through the condenser 19, then passes through the first outlet duct 16, and is blown as heating air into the vehicle interior. On the other hand, as shown in FIG. 8, in the casing 10, the air taken into the second inlet duct 13 exchanges heat with the evaporator 21 when passing through the evaporator 21, then passes through the second outlet duct 17, and is discharged to the outside of the vehicle interior.

As described above, the air-conditioning apparatus 1 according to this embodiment can switch between cooling operation and heating operation by switching the flow of air to the heat exchange unit 11 in the casing 10. Therefore, the number of various incidental components such as pipes, valves, and fittings can be reduced, and the increase in product cost and the increase in weight can thereby be suppressed.

In the air-conditioning apparatus 1 according to this embodiment, the subcooler 25 that subcools refrigerant before the refrigerant is expanded in the expansion valve 20 is disposed at a position below the evaporator 21 to which condensed water W flows down. For this reason, the refrigerant in the subcooler 25 can be efficiently subcooled by condensed water flowing down to the subcooler 25 during the operation of the air-conditioning apparatus 1. Therefore, when the air-conditioning apparatus 1 according to this embodiment is used, air-conditioning efficiency can be improved.

In the air-conditioning apparatus 1 according to this embodiment, the subcooler 25 is disposed at a position below the evaporator 21 away from the heat exchange region of the condenser 19. For this reason, a sufficiently large heat exchange region of the condenser 19 can be secured. Therefore, the condensation pressure in the condenser 19 can be reduced, and the energy consumption in the condenser can thereby be reduced.

In the air-conditioning apparatus 1 according to this embodiment, since the condenser 19 and the evaporator 21 of the heat exchange unit 11 are arranged side by side in a substantially horizontal direction, the first blower 14 blowing air to the evaporator 21 and the second blower 15 blowing air to the condenser 19 can be coaxially arranged side by side in a substantially horizontal direction. For this reason, the first blower 14 and the second blower 15 can be intensively arranged in the casing 10. Therefore, when the air-conditioning apparatus 1 according to this embodiment is used, the structure of the casing 10 can be simplified and the size of the casing 10 can be reduced.

In the air-conditioning apparatus 1 according to this embodiment, the condenser 19 and the evaporator 21 of the heat exchange unit 11 are connected to each other with the heat-insulating member 22 interposed therebetween, in a region except for the part connecting the flow passages of the condenser 19 and the evaporator 21. For this reason, the surface of the condenser 19 and the surface of the evaporator 21 can be prevented from directly exchanging heat with each other. Since the heat exchange part of the condenser 19 and the heat exchange part of the evaporator 21 can be disposed close to each other, the refrigerant passage between the condenser 19 and the evaporator 21 can be shortened. Therefore, the pressure loss in the refrigerant passage can thereby be reduced.

The air-conditioning apparatus 1 according to this embodiment is set such that the refrigerant flowing through the condenser 19 and the evaporator 21 is directed from the upper passages 190 and 210 to the lower passages 19L and 21L, and the air flowing around the condenser 19 and the evaporator 21 is directed upward. For this reason, the direction of the flow of refrigerant flowing through the condenser 19 and the evaporator 21 and the direction of the flow of air flowing around the condenser 19 and the evaporator 21 approach directions opposite to each other. Therefore, owing to this configuration, the efficiency of heat exchange between refrigerant and air in the condenser 19 and the evaporator 21 can be improved.

In the air-conditioning apparatus 1 according to this embodiment, a receiver tank 24 that separates refrigerant into gas and liquid is disposed in an air flow part below the condenser 19. For this reason, when air passes through the air flow part below the condenser 19 as shown in FIG. 7, the air cools the refrigerant in the receiver tank 24. Therefore, even before the refrigerant flows into the subcooler 25, the refrigerant can be cooled in the receiver tank 24. Therefore, even in a situation in which sufficient condensed water is not generated in the evaporator 21, the refrigerant can be subcooled by the receiver tank 24 and the subcooler 25.

In the air-conditioning apparatus 1 according to this embodiment, the subcooler 25 and the chamber 23 that dissipates the flow noise of the refrigerant sucked into the compressor 18 are integrated with the receiver tank 24 below the evaporator 21 and the condenser 19. For this reason, the size of the whole heat exchange unit 11 can be reduced.

This disclosure is not limited to the above-described embodiment, and various changes may be made without departing from the spirit thereof. For example, although the above-described embodiment is an air-conditioning apparatus capable only of switching between cooling operation and heating operation, the air-conditioning apparatus may have a passage structure in which air cooled below the dew point by the evaporator can be further heat-exchanged in the condenser so that a user can select dehumidification heating operation. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. An air-conditioning apparatus comprising: a heat exchange unit including a condenser that radiates heat of refrigerant discharged from a compressor, and an evaporator that expands the refrigerant flowing out of the condenser using an expanding device and then absorbs ambient heat into the evaporator, the condenser and the evaporator being connected to each other,
wherein, according to operation mode, the air-conditioning apparatus causes air to be supplied to a vehicle interior to selectively exchange heat with the condenser or the evaporator, or to sequentially exchange heat with the condenser and the evaporator,
wherein the heat exchange unit further comprises a subcooler that cools the refrigerant flowing out of the condenser before the refrigerant is expanded by the expanding device,
wherein the evaporator is tilted such that the evaporator includes an upper part and a lower part, and the subcooler is disposed abutting the lower part of the evaporator such that condensed water flows down to the subcooler,
wherein the air-conditioning apparatus is configured to cause the air to be supplied to the vehicle interior to pass through the condenser during heating operation and cause the air to be supplied to the vehicle interior to pass through the evaporator during cooling operation without switching flow of the refrigerant between the heating operation and the cooling operation.

2. The air-conditioning apparatus according to claim 1, wherein the condenser and the evaporator of the heat exchange unit are arranged side by side in a substantially horizontal direction.

3. The air-conditioning apparatus according to claim 1, wherein the condenser and the evaporator are connected to each other with a heat insulator interposed therebetween in a region except for a part connecting refrigerant passages of the condenser and the evaporator.

4. The air-conditioning apparatus according to claim 1, wherein the refrigerant flowing through the condenser and the evaporator flows from an upper passage to a lower passage, and air exchanging heat with the condenser flows upwardly and air exchanging heat with the evaporator flows upwardly.

5. The air-conditioning apparatus according to claim 1, wherein the heat exchange unit has a receiver tank that separates the refrigerant flowing out of the condenser into gas and liquid before the refrigerant flows into the subcooler, and the receiver tank is disposed in an air flow part below the condenser.

6. The air-conditioning apparatus according to claim 5, wherein the heat exchange unit has a chamber that dissipates flow noise of the refrigerant flowing out of the evaporator and sucked into the compressor, and the subcooler and the chamber are integrated with the receiver tank below the evaporator and the condenser.

7. The air-conditioning apparatus according to claim 4, wherein the evaporator includes a first upper passage and a first lower passage connected to the first upper passage, and the condenser includes a second upper passage and a second lower passage connected to the second upper passage,
wherein the air is introduced on a first lower passage side of the evaporator, flows upward through the evaporator toward a first upper passage side of the evaporator.

8. The air-conditioning apparatus according to claim 5, wherein the heat exchange unit includes a condenser air intake passage disposed below the condenser, the receiver tank is disposed downstream of the condenser and upstream of the subcooler, and the receiver tank is exposed to the condenser air intake passage.

9. The air-conditioning apparatus according to claim 8, wherein the evaporator includes a first upper passage and a first lower passage connected to the first upper passage, and the condenser includes a second upper passage and a second lower passage connected to the second upper passage,
wherein the air is introduced in the condenser air intake passage, flows upward through the condenser toward a second upper passage side of the condenser.

10. The air-conditioning apparatus according to claim 1, wherein the subcooler is disposed downstream of the condenser and upstream of the expanding device.

11. The air-conditioning apparatus according to claim 1, wherein the condensed water is water condensed on a surface of the evaporator.

12. A vehicle comprising the air-conditioning apparatus according to claim 1.

* * * * *